(12) United States Patent
Wuebbolt-Gorbatenko et al.

(10) Patent No.: US 11,981,381 B2
(45) Date of Patent: May 14, 2024

(54) ACTUATOR FOR A REAR AXLE STEERING SYSTEM OF A VEHICLE AND REAR AXLE STEERING SYSTEM HAVING SUCH AN ACTUATOR

(71) Applicant: Schaeffler Technologies AG & Co. KG, Herzogenaurach (DE)

(72) Inventors: Benjamin Wuebbolt-Gorbatenko, Erlangen (DE); Daniel Faber, Nuremberg (DE); Alexander Hausmann, Erlangen (DE); Simon Mersmann, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 359 days.

(21) Appl. No.: 17/294,703

(22) PCT Filed: Aug. 27, 2019

(86) PCT No.: PCT/DE2019/100774
§ 371 (c)(1),
(2) Date: May 18, 2021

(87) PCT Pub. No.: WO2020/108681
PCT Pub. Date: Jun. 4, 2020

(65) Prior Publication Data
US 2022/0001922 A1    Jan. 6, 2022

(30) Foreign Application Priority Data
Nov. 29, 2018  (DE) .................... 10 2018 130 228.2

(51) Int. Cl.
*B62D 7/15* (2006.01)
*B62D 5/04* (2006.01)
(Continued)

(52) U.S. Cl.
CPC ............. *B62D 7/1545* (2013.01); *B62D 7/20* (2013.01); *B62D 5/0403* (2013.01); *B62D 15/0225* (2013.01)

(58) Field of Classification Search
CPC ...... B62D 7/1545; B62D 7/20; B62D 5/0403; B62D 15/0225; B62D 5/0448; B62D 7/1581
See application file for complete search history.

(56) References Cited

U.S. PATENT DOCUMENTS 2,169,335 A * 8/1939 Best .................... B60G 3/26
280/124.152
2,192,175 A * 3/1940 Ballard .................... B62D 3/14
92/138

(Continued)

FOREIGN PATENT DOCUMENTS

CN          1812908 A    8/2006
CN        102245460 A   11/2011
(Continued)

*Primary Examiner* — Paul N Dickson
*Assistant Examiner* — Timothy Wilhelm

(57) ABSTRACT

An actuator (1) for a rear axle steering system of a vehicle includes a thrust rod (2) which is longitudinally displaceable within a housing (3). The thrust rod (2) has a rotation lock (4) having a guide element (5) which is guided in the axial direction in a single-part or multi-part slide rail (6) arranged on the housing (3). An elastomer ring (7) is arranged between the slide rail (6) and the housing (3).

20 Claims, 2 Drawing Sheets

(51) Int. Cl.
*B62D 7/20* (2006.01)
*B62D 15/02* (2006.01)

(56) References Cited

U.S. PATENT DOCUMENTS

| | | | | |
|---|---|---|---|---|
| 2,760,783 | A * | 8/1956 | Keith | B60G 3/26 |
| | | | | 267/286 |
| 2,895,741 | A * | 7/1959 | Mineck | B62D 7/00 |
| | | | | 280/124.13 |
| 3,886,693 | A * | 6/1975 | Tajnafoi | F16H 35/00 |
| | | | | 451/228 |
| 4,765,651 | A * | 8/1988 | Unger | B60R 22/023 |
| | | | | 74/89.14 |
| 5,226,801 | A * | 7/1993 | Cobile | B60G 15/00 |
| | | | | 417/233 |
| 6,224,075 | B1 * | 5/2001 | McIntyre | B62D 17/00 |
| | | | | 280/86.756 |
| 6,485,038 | B1 * | 11/2002 | Garrard | B62D 17/00 |
| | | | | 280/86.754 |
| 6,557,872 | B1 * | 5/2003 | Garrard | B60G 3/265 |
| | | | | 280/86.754 |
| 6,793,228 | B2 * | 9/2004 | Zadok | B60G 15/067 |
| | | | | 280/124.135 |
| 7,278,648 | B2 * | 10/2007 | Bobbitt, III | B62D 17/00 |
| | | | | 280/124.123 |
| 7,347,433 | B2 * | 3/2008 | Pressler | B62D 15/023 |
| | | | | 280/93.5 |
| 7,377,522 | B2 * | 5/2008 | MacIsaac | B62D 39/00 |
| | | | | 280/5.506 |
| 7,427,073 | B2 * | 9/2008 | Won | B60G 3/06 |
| | | | | 280/5.506 |
| 7,513,514 | B1 * | 4/2009 | Schlosser | B62D 17/00 |
| | | | | 280/86.756 |
| 7,857,332 | B2 * | 12/2010 | Hsu | B60G 7/005 |
| | | | | 280/86.757 |
| 8,141,891 | B2 * | 3/2012 | Yu | F16F 7/082 |
| | | | | 280/124.145 |
| 8,170,826 | B2 * | 5/2012 | Krammer | B62D 15/0245 |
| | | | | 702/92 |
| 8,398,092 | B2 * | 3/2013 | Lee | B60G 17/025 |
| | | | | 280/5.511 |
| 8,540,251 | B2 * | 9/2013 | Lee | B60G 17/0162 |
| | | | | 280/5.508 |
| 8,579,313 | B2 * | 11/2013 | Lee | B60G 17/0162 |
| | | | | 280/124.152 |
| 8,607,920 | B2 * | 12/2013 | Jungbecker | B62D 7/146 |
| | | | | 180/413 |
| 8,670,900 | B2 * | 3/2014 | Nishioka | B62D 7/146 |
| | | | | 701/41 |
| 8,746,705 | B1 * | 6/2014 | Kim | B60G 7/001 |
| | | | | 280/124.152 |
| 9,248,718 | B2 * | 2/2016 | Kuhnt | B62D 15/0225 |
| 9,387,874 | B2 * | 7/2016 | Fujii | B62D 7/1581 |
| 2003/0052467 | A1 * | 3/2003 | Allman | B62D 17/00 |
| | | | | 280/86.756 |
| 2004/0206195 | A1 * | 10/2004 | Landskron | B60N 2/929 |
| | | | | 74/89.14 |
| 2005/0098376 | A1 | 5/2005 | Ozsoylv et al. | |
| 2006/0022420 | A1 * | 2/2006 | Pressler | B62D 15/023 |
| | | | | 280/93.512 |
| 2008/0223160 | A1 * | 9/2008 | Yamaguchi | B60G 7/006 |
| | | | | 74/89.23 |
| 2010/0019465 | A1 * | 1/2010 | Yuta | B60G 3/20 |
| | | | | 280/86.758 |
| 2010/0204888 | A1 * | 8/2010 | Nishioka | B60G 7/003 |
| | | | | 701/41 |
| 2011/0284313 | A1 * | 11/2011 | Jungbecker | B60G 7/006 |
| | | | | 180/443 |
| 2012/0199413 | A1 | 8/2012 | Fujinori et al. | |
| 2013/0147141 | A1 * | 6/2013 | Lee | B60G 21/0553 |
| | | | | 280/124.106 |
| 2013/0147143 | A1 * | 6/2013 | Lee | B60G 21/0553 |
| | | | | 280/124.106 |
| 2014/0353067 | A1 * | 12/2014 | Fujii | B60G 7/006 |
| | | | | 180/444 |
| 2014/0353071 | A1 * | 12/2014 | Ando | B62D 15/0225 |
| | | | | 180/445 |

FOREIGN PATENT DOCUMENTS

| | | |
|---|---|---|
| CN | 103038123 A | 4/2013 |
| CN | 103974872 A | 8/2014 |
| CN | 106458243 A | 2/2017 |
| DE | 102008002176 | 12/2009 |
| DE | 102009038232 | 2/2011 |
| DE | 102010052917 | 5/2012 |
| DE | 102008051544 B4 | 12/2012 |
| DE | 102012021582 | 8/2013 |
| DE | 102011119161 B4 | 10/2013 |
| DE | 102016206564 | 10/2017 |
| DE | 102016206564 A1 | 10/2017 |
| EP | 0310770 A2 | 4/1989 |
| EP | 2886908 | 6/2015 |
| JP | 2014232035 A | 12/2014 |

\* cited by examiner

ACTUATOR FOR A REAR AXLE STEERING SYSTEM OF A VEHICLE AND REAR AXLE STEERING SYSTEM HAVING SUCH AN ACTUATOR

CROSS-REFERENCE TO RELATED APPLICATIONS

This application is the U.S. National Phase of PCT Appln. No. PCT/DE2019/100774 filed Aug. 27, 2019, which claims priority to DE 10 2018 130 228.2 filed Nov. 29, 2018, the entire disclosures of which are incorporated by reference herein.

TECHNICAL FIELD

The disclosure relates to an actuator for a rear axle steering system of a vehicle, comprising a thrust rod, which is longitudinally displaceable within a housing and has a rotation lock. The disclosure also relates to a rear-axle steering system with an actuator of this type and a vehicle comprising such a rear-axle steering system.

BACKGROUND

DE 10 2016 206 564 A1 discloses an actuator having a housing and a spindle drive having a spindle and a spindle nut. The spindle nut can be driven in the direction of rotation and the spindle, which has a rotation lock, is axially adjustable and supported on at least one spindle end on the housing side. The rotation lock comprises a coupling rod which is supported with respect to the housing via a first joint and connected to the spindle via a second joint.

SUMMARY

It is desirable to further develop an electromechanical actuator for a rear axle steering system of a vehicle.

An actuator for a vehicle comprises a thrust rod which is longitudinally displaceable within a housing, wherein the thrust rod has a rotation lock having a guide element which is guided in the axial direction in a one-part or multi-part slide rail arranged on the housing, wherein an elastomer ring is arranged in between the slide rail and the housing. The actuator is provided for setting a steering angle of vehicle wheels that are operatively connected to the actuator on a rear axle of the vehicle by axially displacing the thrust rod relative to the housing. This, for example, initiates a cornering of the vehicle.

For this purpose, the thrust rod preferably has at the free ends thereof a respective fork connection with a fork element on which the respective vehicle wheel is at least indirectly received. The thrust rod is preferably constructed in one or more parts and has a threaded spindle which is connected to it in one or more parts and is arranged concentrically therewith. Furthermore, a drive unit, for example in the form of an electric motor, can be provided to drive an axially immovable, rotationally driven threaded nut, which is operatively connected to the threaded spindle and thus indirectly to the thrust rod. The threaded spindle, together with the thrust rod, is set in a lengthwise displacement or in a longitudinal displacement relative to the housing or the threaded nut by a rotation of the threaded nut. The threaded spindle and the threaded nut thus form a threaded drive, wherein the rotary drive of the threaded nut causes a linear adjusting movement of the thrust rod for setting the steering angle. Furthermore, the drive unit can comprise a transmission device which is designed, for example, as a belt transmission and is operatively connected to the threaded nut.

The rotation lock between the tie rod and the housing is implemented by the guide element axially guided along the slide rail, wherein the slide rail essentially has or forms an elongated hole for this purpose, which at least partially receives the guide element and guides it in the axial direction. In other words, the guide element, the slide rail and the elastomer ring form the rotation lock. The guide element and/or the slide rail are preferably formed from a plastic. In this way, in particular, an inexpensive and low-friction rotation lock is provided. Furthermore, the weight of the actuator is reduced.

The elastomer ring is preferably made of an elastically deformable material and, due to the arrangement between the housing and the slide rail, interrupts or attenuates a structure-borne noise which can occur, for example, as a result of the direction of rotation of the threaded nut. In other words, the slide rail and thus also the guide element do not come into contact with the housing during operation of the actuator.

The slide rail is preferably designed in two parts and consists of a first and a second rail element. The two rail elements jointly form the elongated hole on the facing sides thereof, within which the guide element is guided in the displacement direction of the thrust rod, wherein the position of the rail elements relative to the guide element is held by the elastomer ring. The rail elements are designed in such a way that they can be moved towards one another transversely to a direction of displacement of the guide element by means of the elastomer ring. For this purpose, a gap can be formed between the rail elements to avoid undesired deformation or pre-tensioning of the rail elements. The two-part design of the slide rail reduces friction within the rotation lock, since the guide element does not come into direct contact with the elastomer ring.

The elastomer ring may be arranged around the two rail elements. In other words, the elastomer ring spatially surrounds the two rail elements and the guide element so that the rail elements are held in the position thereof. The elastomer ring is also preferably designed to be oversized so that the inner circumference of the elastomer ring clings to the rail elements in the radial direction and consequently presses or pressures them against the guide element. The rail elements are therefore pre-tensioned with respect to the guide element. A rotation lock free from play between the tie rod and the housing is thereby advantageously implemented. In other words, play between the guide element, the housing and the slide rail is eliminated by the elastomer ring. Furthermore, due to the resilient effect of the elastomer ring, the guide element remains displaceable relative to the slide rail in the axial direction of the thrust rod.

The guide element may be received at least partially in a recess on the thrust rod and fastened to the thrust rod by means of at least one screw element. The guide element is therefore connected to the thrust rod in a rotationally fixed manner. Alternative connections between the guide element and the thrust rod are also conceivable.

According to an embodiment, a sensor device is provided, comprising at least one sensor element and one measurement object, wherein the measurement object is arranged on the guide element and effectively connected to the at least one sensor element, which is at least indirectly fastened to the housing. The at least one sensor element is preferably arranged fixed to the housing, wherein the measurement object is integrated into the guide element as a sensor counterpart and interacts with the at least one sensor element. Alternatively, it is conceivable to arrange the at least one sensor element on the thrust rod which is arranged on the housing.

The at least one sensor element is preferably a linear sensor. In this case, a relative position of the thrust rod relative to the housing is detected in particular by means of an optical measuring method, for example by means of a path and/or distance measurement, wherein the recorded data can be provided for further evaluation, for example by a control and evaluation unit. Measurement methods based on a different physical measurement principle are also conceivable for the sensor device.

Such an actuator is preferably used in a rear axle steering system. The vehicle can have a plurality of rear axles, with one or more rear axles each having a respective rear axle steering system with a respective actuator.

BRIEF DESCRIPTION OF THE DRAWINGS

Further measures are shown in more detail below together with the description of an exemplary embodiment based on the figures. In the figures

DETAILED DESCRIPTION

Figure 1:
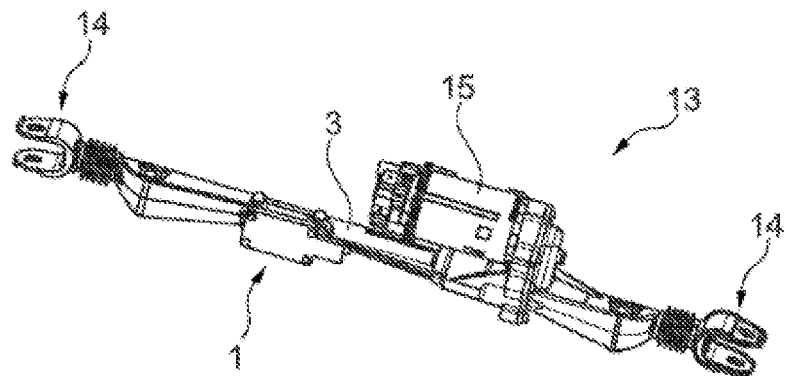
FIG. 1 shows a simplified schematic view of a rear axle steering system.
Figure 3:
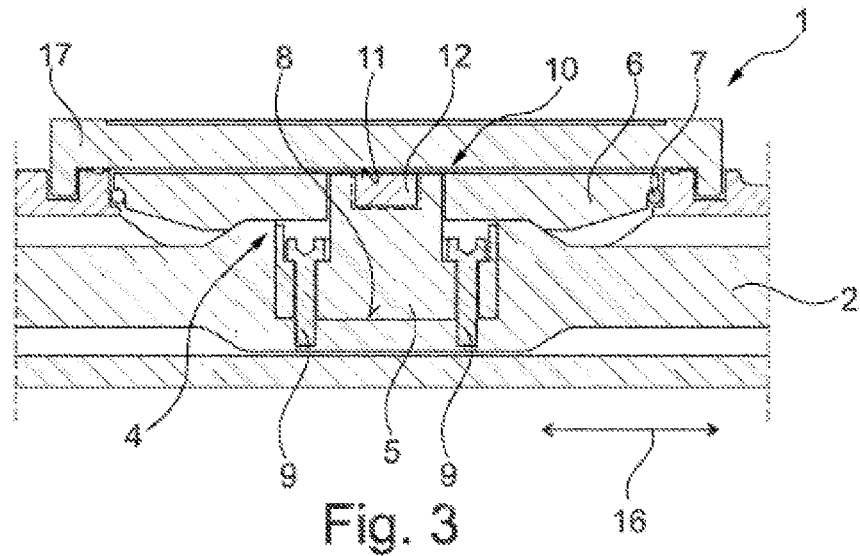
FIG. 3 shows a schematic longitudinal sectional illustration of the actuator according to FIG. 2.
Figure 4:
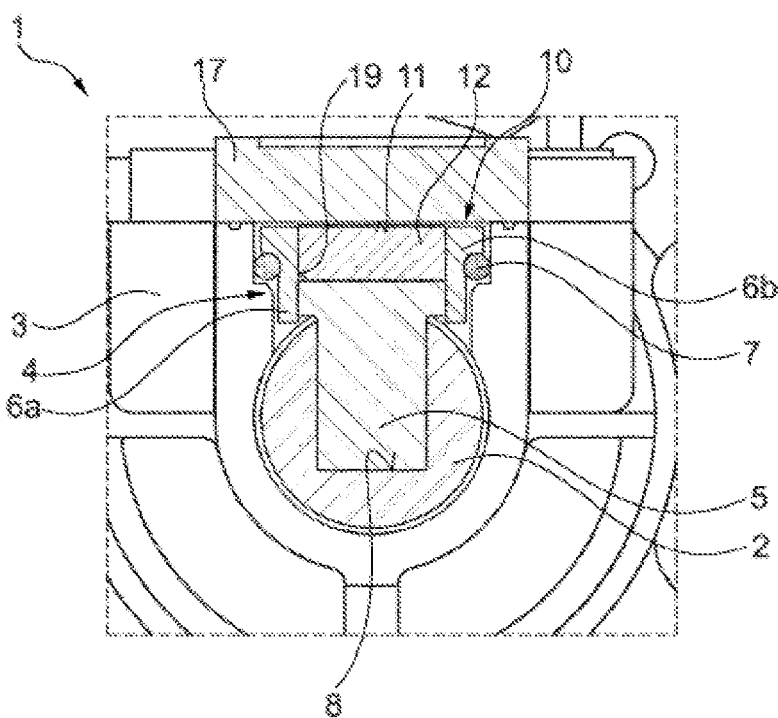
FIG. 4 shows a schematic cross-sectional representation of the actuator according to FIGS. 2 and 3.

According to FIG. 1, a rear axle steering system for a vehicle—not shown here—is shown which comprises an actuator 1 having a housing 3 in which a thrust rod 2 shown in FIGS. 3 and 4 is longitudinally guided. By means of the thrust rod 2, adjustments can be made in a steering angle of respective vehicle wheels—also not shown here—which are at least indirectly arranged on fork elements 14 of the rear axle steering system. Furthermore, the rear axle steering system has a drive unit 15 which at least indirectly displaces the thrust rod 2 into a longitudinal displacement.

Figure 2:
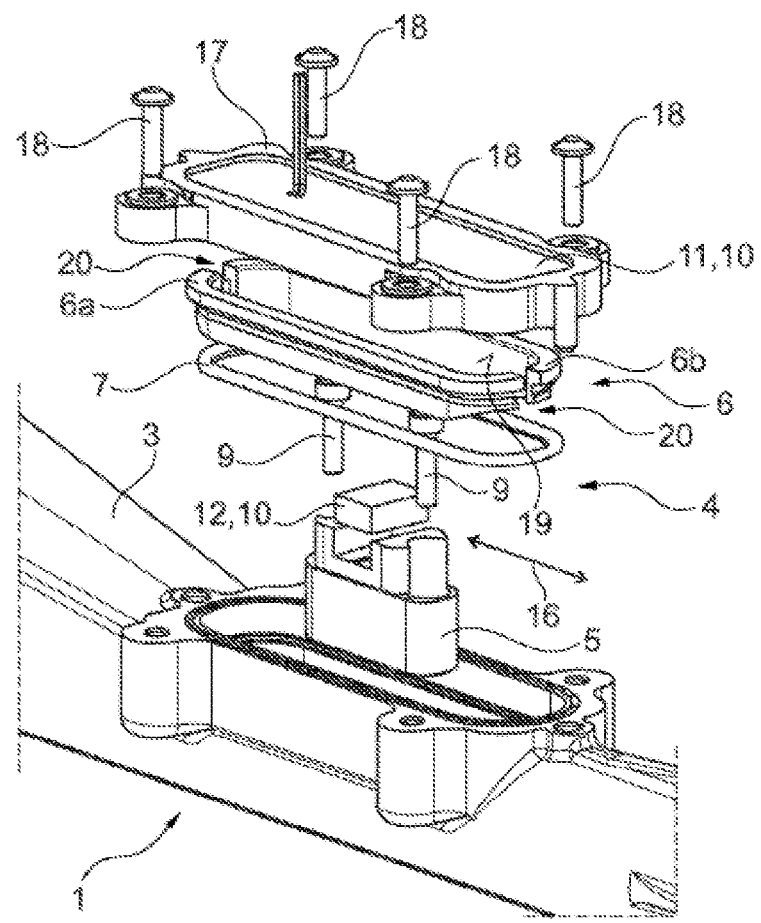
FIG. 2 shows a schematic exploded view of an actuator.

According to FIGS. 2 through 4, the thrust rod 2, which is axially displaceable along the housing 3, has a rotation lock 4 with a guide element 5, wherein the guide element 5 is axially guided in a two-part slide rail 6 arranged on the housing 3. As can be seen particularly well from FIGS. 3 and 4, the guide element 5 is inserted into a recess 8 on the thrust rod 2 and fastened to the thrust rod 2 by means of two screw elements 9 for a fixed connection.

The two-part slide rail 6 consists of a first and second rail element 6a, 6b, wherein the two rail elements 6a, 6b jointly form an elongated hole 19 on the mutually facing sides thereof in which the guide element 5 is longitudinally guided in a displacement direction 16. The guide element 5 and the rail elements 6a, 6b of the slide rail 6 are formed from a plastic.

The actuator 1 also has a sensor device 10 designed as a linear sensor, which has a sensor element 11 arranged in a cover 17 and a measurement object 12 as a sensor counterpart which is firmly connected to the guide element 5. The cover 17 is fixed to the housing 3 by means of four screw elements 18. During an axial displacement of the thrust rod 2, a relative axial position of the thrust rod 2 with respect to the housing 3 can be detected by means of the sensor device 10. The sensor element 11 is therefore operatively connected to the measurement object.

FIGS. 3 and 4 show in more detail that an elastomer ring 7 is arranged between the slide rail 6 and the housing 3. The elastomer ring 7 is arranged around the two rail elements 6a, 6b and is designed to be oversized, i.e., the elastomer ring 7 is designed in relation to the rail elements 6a, 6b in such a way that the rail elements 6a, 6b are permanently pre-tensioned towards the guide element 5. In other words, a permanent contact between the rail elements 6a, 6b and the guide element 5 is realized that is free of play, whereby a switching noise within the actuator 1 is prevented while reversing the direction of rotation of a drive unit which sets the thrust rod 2 in a longitudinal movement. A rotation lock of the tie rod 2 with respect to the housing 7 that is free of play is thus implemented, with structure-borne sound transmission between the tie rod 2 and the housing 3 being prevented by the elastomer ring 7.

According to FIG. 2, the two rail elements 6a, 6b are essentially C-shaped or U-shaped, the two rail elements 6a, 6b extending essentially in parallel to the direction of displacement 16 of the guide element 5. A respective gap 20 is formed between the rail elements 6a, 6b which enables the rail elements 6a, 6b to be displaced transversely to the direction of displacement 16, that is, in the direction of the guide element 5.

LIST OF REFERENCE SYMBOLS

1 Actuator
2 Thrust rod
3 Housing
4 Rotation lock
5 Guide element
6 Slide rail
6a, 6b Rail element
7 Elastomer ring
8 Recess
9 Screw element
10 Sensor device
11 Sensor element
12 Measurement object
14 Fork element
15 Drive unit
16 Direction of displacement
17 Cover
18 Screw element for cover
19 Elongated hole
20 Gap

The invention claimed is:

1. An actuator for a rear axle steering system of a vehicle, comprising a thrust rod which is longitudinally displaceable within a housing, the thrust rod having a rotation lock with a guide element which is guided in an axial direction in a slide rail arranged on the housing, wherein an elastomer ring is: i) arranged between the slide rail and the housing, and ii) configured to pre-tension the slide rail against the guide element.

2. The actuator according to claim 1, wherein the slide rail is constructed of two separate parts comprising a first rail element and a second rail element, the first rail element separated from the second rail element by a gap.

3. The actuator according to claim 2, wherein the elastomer ring is arranged around the first rail element and the second rail element.

4. The actuator according to claim 2, wherein the gap is configured to enable the first rail element and the second rail element to be displaced transversely to the axial direction by the elastomer ring.

5. The actuator according to claim 1, wherein the guide element is at least partially received in a recess on the thrust rod and is fastened to the thrust rod by means of at least one screw element.

6. The actuator according to claim 1, wherein a sensor device is provided, comprising at least one sensor element and a measurement object, wherein the measurement object is arranged on the guide element and is effectively connected to the at least one sensor element, which is fastened at least indirectly to the housing.

7. The actuator according to claim 6, wherein the at least one sensor element is a linear sensor.

8. The actuator according to claim 1, wherein the guide element or the slide rail is made from plastic.

9. A rear-axle steering system for a vehicle, comprising an actuator according to claim 1.

10. A vehicle comprising a rear axle steering system according to claim 9.

11. The actuator according to claim 1, wherein the guide element is at least partially received in a recess on the thrust rod and is fastened to the thrust rod by means of at least one screw element.

12. An actuator for a rear axle steering system of a vehicle, comprising:
   a housing;
   at least one slide rail supported with respect to the housing via an elastomer ring;
   a thrust rod which is displaceable in an axial direction within the housing; and
   a guide element fixed to the thrust rod and guided in the axial direction by the slide rail, and
   the elastomer ring is configured to move the at least one slide rail toward the guide element.

13. The actuator according to claim 12, wherein the at least one slide rail comprises a first rail element and a second rail element configured to move toward each other via the elastomer ring.

14. The actuator according to claim 13, wherein the first rail element and the second rail element are C-shaped and are separated on each end by a gap.

15. The actuator according to claim 13, wherein the elastomer ring is arranged around the first and second rail elements.

16. The actuator according to claim 12, further comprising a sensor device having at least one sensor element fixed with respect to the housing and a measurement object fixed with respect to the guide element.

17. The actuator according to claim 16, wherein the sensor device is a linear sensor.

18. The actuator according to claim 12, wherein at least one of the guide element or the at least one slide rail is made from plastic.

19. The actuator according to claim 12, wherein the at least one slide rail is configured to be moved transversely to the axial direction by the elastomer ring.

20. The actuator according to claim 12, wherein the at least one guide rail is configured to be pressed against the guide element by the elastomer ring.

* * * * *